United States Patent [19]

Dion

[11] Patent Number: 4,546,252
[45] Date of Patent: Oct. 8, 1985

[54] METHOD FOR MONITORING POTASSIUM CHLORIDE CONCENTRATION IN DRILLING FLUIDS

[75] Inventor: Eric P. Dion, Dallas, Tex.

[73] Assignee: Mobil Oil Corporation, New York, N.Y.

[21] Appl. No.: 634,090

[22] Filed: Jul. 25, 1984

[51] Int. Cl.⁴ ............................................. G01V 5/00
[52] U.S. Cl. .................................. 250/252.1; 250/256
[58] Field of Search ...................... 250/255, 252.1, 256, 250/358.1

[56] References Cited

U.S. PATENT DOCUMENTS

| | | | |
|---|---|---|---|
| 2,686,881 | 8/1954 | Herzog et al. | 250/256 |
| 4,378,498 | 3/1983 | Givens | 250/256 |
| 4,388,266 | 6/1983 | Givens | 376/164 |
| 4,493,998 | 1/1985 | Smith, Jr. et al. | 250/256 |

*Primary Examiner*—Alfred E. Smith
*Assistant Examiner*—Carolyn E. Fields
*Attorney, Agent, or Firm*—A. J. McKillop; Michael G. Gilman; George W. Hager, Jr.

[57] ABSTRACT

The potassium chloride concentration of a drilling fluid is monitored during well drilling operations to identify any depletion in such concentration with time. Initially, the gamma radiation measuring apparatus utilized is calibrated by making gamma radiation measurements on self-shielded drilling fluid samples having successively increasing potassium chloride concentrations. A calibration constant is derived from the measured relationship between the potassium chloride concentrations of the various drilling fluid samples and their respective gamma radiation count rates. This calibration constant is then used along with the measured gamma radiation count rates from drilling fluid taken during well drilling operations to identify drilling fluid potassium chloride concentration.

7 Claims, 4 Drawing Figures

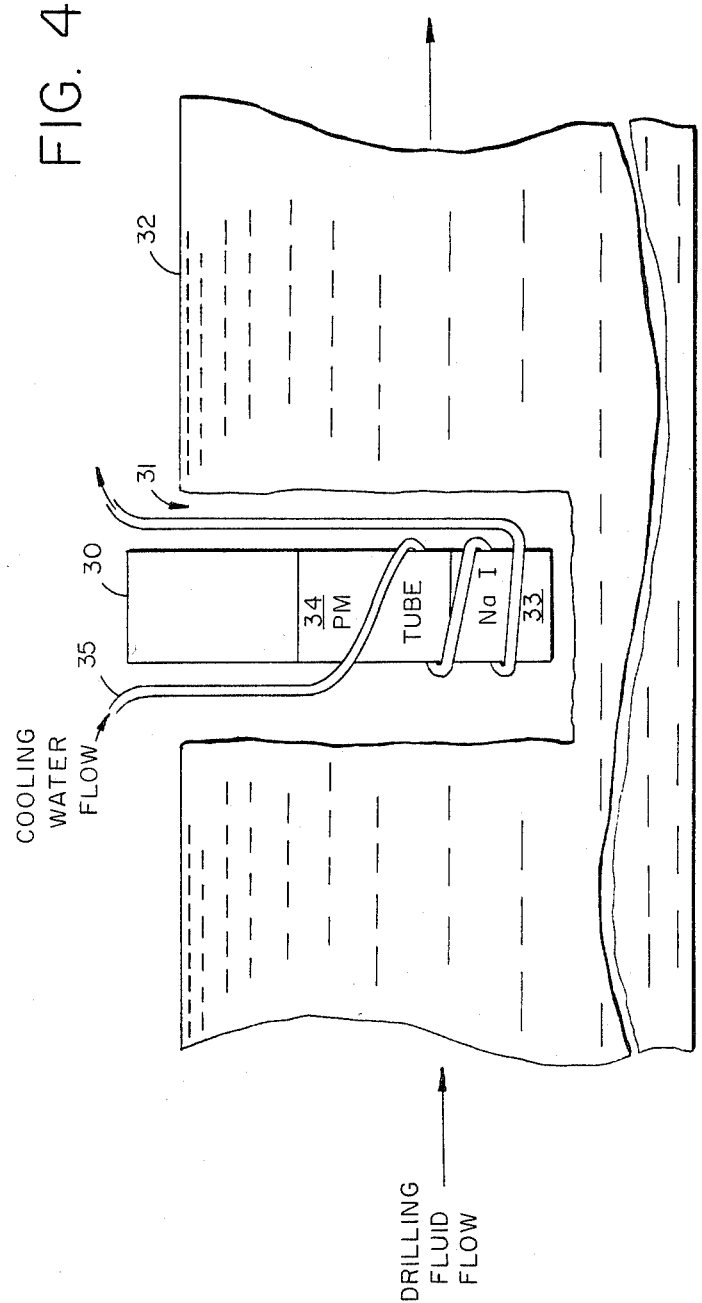

METHOD FOR MONITORING POTASSIUM CHLORIDE CONCENTRATION IN DRILLING FLUIDS

BACKGROUND OF THE INVENTION

This invention relates to drilling fluids and, more particularly, to the monitoring of a drilling fluid to identify change in its potassium chloride property.

In the rotary drilling of wells, such as those for petroleum oil or gas, a drilling fluid is continuously circulated from the surface of the ground to the bottom of the well and back to the surface of the ground again. The drilling fluid has various functions, including those of lubricating the drill bit and pipe, carrying cuttings from the bottom of the well to the surface of the ground, and imposing a hydrostatic pressure on the drilled formations to prevent escape of oil, gas, or water therefrom into the well during the drilling operations.

Frequently, during the drilling of a well, drilling conditions change. Changes in temperature occur. The character of the formations being drilled may change. Each change in drill conditions can affect the properties of the drilling fluid. Frequently, to counteract the effect of the changed drilling conditions on the properties of the drilling fluid, a change in the composition or character of the drilling fluid is required.

In many cases, the drilling fluid contains potassium chloride or other potassium salts to help in maintaining optimum drilling conditions.

The potassium ion, when used at the proper concentration acts as a shale inhibitor. It interacts with clays, such as illite or montmorillonite, lowers the hydration energy and, in turn, reduces swelling. Without the addition of a shale inhibitor, clay hydration can produce drilling problems, such as wellbore instabilities, stuck pipe, bottomhole fill, torque drag and solids build-up in the drilling fluid. Completion problems may also result because of formation damage in shaly sands, logging and coring failures, hole washout, and poor cement jobs. It is, therefore, important to avoid those problems by maintaining the optimum KCl content in the drilling fluid as prescribed by drilling operations.

It is, therefore, a specific object of the present invention to provide a method for monitoring the potassium chloride concentration of a drilling fluid during drilling operation so that such concentration may be maintained for optimum drilling operations.

SUMMARY OF THE INVENTION

The present invention is directed to a method for monitoring the potassium chloride concentration of a drilling fluid during well drilling operations.

Initially the apparatus to be used in carrying out the method is calibrated for the particular gamma radiation detector and drilling fluid container to be used. A sample of the drilling fluid that is known to be free of potassium chloride content is placed in the container and the gamma radiation detector is located centrally within the fluid. The potassium chloride concentration in the fluid is then increased over a range of discrete intervals. After each such increase in potassium chloride concentration, gamma radiation is measured. After all of the radiation measurements have been made, a calibration curve is plotted exhibiting the relationship between potassium chloride concentration and gamma radiation count rate.

After such calibration, the apparatus is ready for use during drilling operations. The container is either periodically or continuously being filled with samples of the drilling fluid as it is being circulated through the well. Following the gamma radiation measurement on each of the samples, the calibration curve is utilized to provide an indication of any depletion in the potassium chloride concentration of the drilling fluid as the well drilling continues.

In a more specific aspect of the invention, calibration is carried out by firstly measuring gamma radiation of a drilling fluid sample that is free of potassium chloride. This radiation is representative of any measureable background radiation within the energy band. Then, the potassium chloride concentration is increased in successive steps and the corresponding gamma radiations measured. The measured background is subtracted from each of the subsequent radiation measurements for the higher concentration samples to provide for a plurality of net potassium count rates for each concentration percentage. Plotting of such net count rates versus concentration percentages produces a linear calibration curve that defines a calibration constant for use during well drilling operations in monitoring potassium chloride concentration.

In a further aspect, the volume of drilling fluid taken as the sample is selected so as to be self-shielding with respect to external background gamma radiation. In this manner, the container does not need to provide any such shielding and can be made with as thin a material as possible so as to make it readily portable for transport to and from well drilling sites.

BRIEF DESCRIPTION OF THE DRAWINGS

FIG. 4 illustrates apparatus useful in the monitoring of a continuous flow of drilling fluid for potassium chloride concentration; and

DESCRIPTION OF THE PREFERRED EMBODIMENTS

The potassium chloride concentration in a drilling fluid is monitored during drilling operations by measuring the potassium gamma radiation level in samples of such drilling fluid taken during the drilling operation. Such a direct radiometric method for determination of potassium has several advantages over chemical methods for such determination as proposed by H. E. Zilch in the *Oil & Gas Journal*, Jan. 16, 1984, pages 106–108. The radiometric method is nondestructive to the drilling fluid samples, is more rapid, requires no reagents or unusual sample preparation, and may be carried out in either a continuous monitoring mode or in a discrete sampling mode.

The potassium content of a drilling fluid is determined by measuring the potassium-40 gamma radiation peak at about 1460 KEV. Since the proportion of potassium-40 in a potassium containing substance is fixed, the intensity of the potassium-40 gamma radiation peak is directly related to the substances total potassium content.

Figure 1:
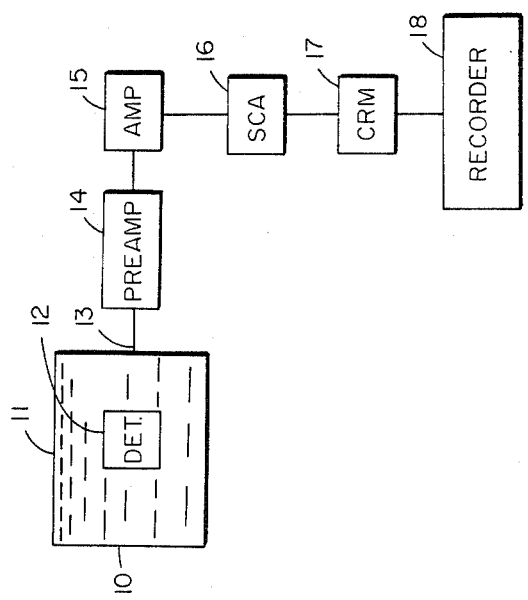
FIG. 1 is a diagrammatic representation of the apparatus utilized in carrying out the method of the present invention of monitoring drilling fluids for potassium chloride concentration.

Apparatus for carrying out the method of the present invention is shown in FIG. 1. A container 10 is filled with a sample 11 of a drilling fluid. A gamma radiation detector 12 is preferably a sodium iodide scintillation detector and photomultiplier tube. The gamma radiation counts produced by the detector 12 are fed from the container by suitable wiring 13 to a preamplifier 14 and amplifier 15. Potassium-40 gamma radiation at 1460 KEV is provided by a single-channel analyzer 16 and count rate meter 17. Single-channel analyzer provides a window for gamma radiation over the energy band of about 1360 KEV to about 1560 KEV. The output of count rate meter 17 provides a gross qualitative measurement of potassium-40 in the drilling fluid sample 11. A recording of the measured gamma radiation counts is made on the recorder 18.

Use of the apparatus shown in FIG. 1 in carrying out the method of the present invention will now be described. Initially, the apparatus is calibrated for the particular configuration of gamma radiation detector 12 and container 10 to be used. The container 10 is filled with a sample of the drilling fluid that is free of potassium chloride content. Gamma radiation is measured, preferably over a period of time that will provide a minimum of 100 counts. Radioactive decay is statistical in nature with 100 counts providing a precision of approximately 10%. A typical counting time is 5 minutes. The gross count rate for the potassium chloride free sample represents background radiation. As illustrated in the following TABLE, one potassium chloride free sample that was measured produced a background count of 146 over the energy range of 1360 KEV to 1560 KEV.

TABLE

| KCl Concentration | Gross Counts 1360–1560 KEV | Net Counts (Gross Counts- Background) | Count Rate (Counts/ Minute) |
|---|---|---|---|
| 0% | 146 | | |
| 2% | 290 | 144 | 28.8 |
| 5% | 471 | 325 | 65.0 |
| 10% | 801 | 655 | 131.0 |
| 20% | 1479 | 1333 | 266.6 |

Figure 2:
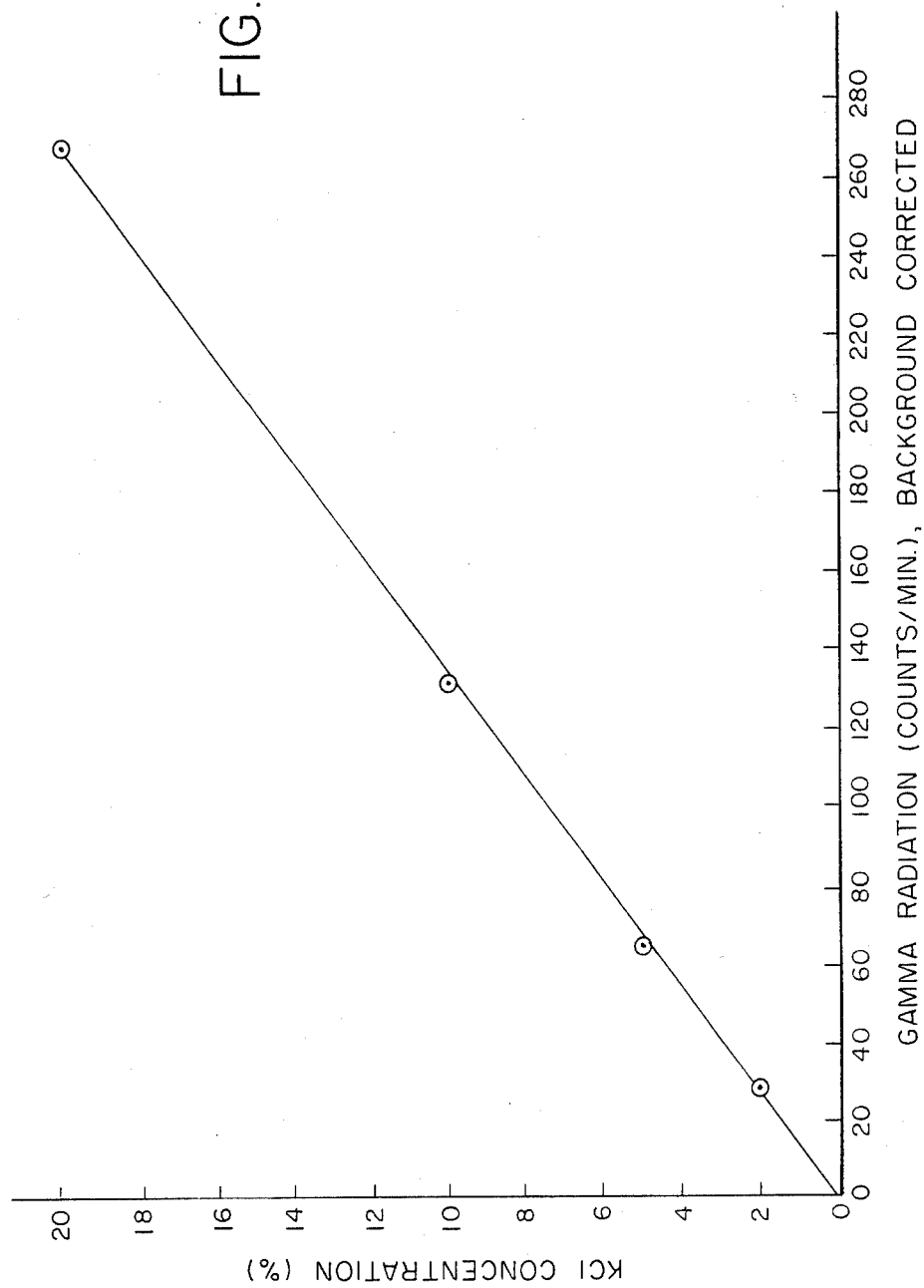
FIG. 2 is a graph depicting a calibration curve obtained by use of the apparatus of FIG. 1 for identifying any depletion in drilling fluid potassium chloride concentration during well drilling operations.

Next, the potassium chloride concentration was increased by the addition of a potassium chloride salt in a series of incremental steps to 2%, 5%, 10% and 20% and the gamma radiation counts for each such concentration were made over a five-minute period as shown in the TABLE. The background count of 146 was subtracted and the resulting net count rate, in counts per minute, tabulated. A plot of the KCl concentration versus net count rate provides the linear calibration curve of FIG. 2 for the particular detector and container combination utilized. The linear relationship between potassium chloride concentration and count rate as derived from least-squares linear regression analysis yields a calibration constant of 0.0753 as shown in equation (1) below:

$$\%K = 0.0753 \times \text{count rate} \tag{1}$$

This combination of detector and container is now calibrated and ready for use in the measuring of the potassium chloride concentration of a drilling fluid during actual well drilling operations.

As the drilling fluid is sampled, its gamma radiation is measured. The derived calibration constant is utilized to determine depletion in the potassium chloride concentration of the drilling fluid as drilling operations progress by the multiplication of the measured gamma radiation count rate with the derived calibration constant. Any change in the configuration or size of the container or the use of a new detector will require the recalibration of the apparatus with derivation of a new calibration constant.

It is an important aspect of the invention to provide adequate shielding of the gamma radiation detector from any external background radiation. Typically, gamma radiation detectors have been shielded by shielding materials forming part of the container itself, such as a lead shielding material. Up to four inches of lead shielding has been found to be necessary under normal laboratory environmental conditions for proper shielding. Such a container is not readily portable. To provide for a lighter weight container that can be more easily transported to the field during well drilling operations, applicant utilizes the drilling fluid sample itself as the shielding material rather than utilizing the container or other shielding means. A self-shielding detector and container combination for measuring gamma radiation of discrete samples is shown in FIG. 3, while a self-shielding detector and container combination for measuring gamma radiation of a continuously flowing fluid is shown in FIG. 4.

Figure 3:
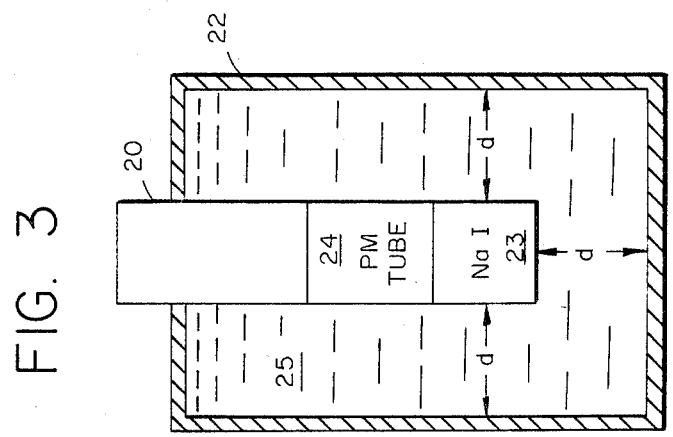
FIG. 3 illustrates apparatus useful in the monitoring of discrete samples of drilling fluid for potassium chloride concentration.

Referring to FIG. 3, a gamma radiation detector 20 comprising a sodium iodide crystal 23 and photomultiplier tube 24 is inserted through an opening in container 22 into the inner portion 25 which is filled with a discrete drilling fluid sample to be analyzed. In FIG. 4, a gamma radiation detector 30 comprising a sodium iodide crystal 33 and photomultiplier 34 is inserted into a recess 31 of a container 32 which is in the form of a flowline through which a drilling fluid is being continuously passed. Preferably, detector 30 is surrounded by a cooling coil 35 to minimize detector gain changes due to temperature variations. In both the configurations of FIGS. 3 and 4, the thickness d of the drilling fluid surrounding the sodium iodide detectors 23 and 33 must be sufficient to provide proper external gamma radiation shielding in all directions, as well as providing a larger sample. In this manner, the gamma radiation detector becomes "self-shielding" by maximizing the ratio of $^{40}K$ radiation to background radiation. In cases where background is abnormally high, the thickness of sample surrounding the detector should be increased so as to provide a ratio of gross count to background of approximately two or more.

The effectiveness of "self-shielding" of the sample container depends both on the composition of the drilling mud and the size of the container. Background radiation arises from both sources external to the container and from natural radioelements present in the drilling fluid solids. A six-inch thickness of a typical drilling fluid will reduce background radiation from external sources by approximately one-half. In most cases, such a thickness will be adequate. Denser drilling muds will provide better shielding to external gamma rays. Certain mud compositions will contain potassium-bearing substances other than KCl. This is why a sample of KCl free drilling fluid is used to determine background.

I claim:

1. A method for monitoring the potassium chloride concentration in a drilling fluid during well drilling operations, comprising the steps of:
(a) selecting a container for holding a drilling fluid,
(b) centrally locating a gamma radiation detector within said container,
(c) filling said container with drilling fluid containing no measurable potassium chloride content in an amount that is self-shielding with respect to background radiation external to said container,
(d) recording the gamma radiation measured by said detector over a given time period within an energy band centered about the peak gamma radiation of potassium, said radiation being representative of background radiation within said energy band attributable to natural radioelements present within said drilling fluid exclusive of said external background radiation,
(e) adding a potassium chloride salt to said fluid to increase the potassium chloride concentration of said fluid to a predetermined concentration percentage,
(f) recording the gamma radiation measured by said detector over said given time period within said energy band for said potassium chloride containing fluid,
(g) repeating steps (e) and (f) for a plurality of potassium chloride concentration percentages,
(h) subtracting said drilling fluid background radiation from each of said plurality of potassium chloride gamma radiation measurements to obtain a net potassium count rate for each of said plurality of measurements,
(i) plotting potassium count rates against the corresponding potassium chloride concentrations attributing to said count rates to obtain a calibration curve for use in identifying the potassium chloride concentration of an unknown sample of a drilling fluid when measured with the specific combination of said detector and said container,
(j) filling said container with drilling fluid taken as it is being circulated through a well during a drilling operation, and
(k) measuring the gamma radiation count rates of said drilling fluid and utilizing said calibration curve to provide an indication of any depletion in the potassium chloride concentration of said drilling fluid as said well drilling operation continues.

2. The method of claim 1 wherein the size of said container is selected such that the amount of drilling fluid surrounding said detector provides for a ratio of gross gamma radiation to external background radiation of at least two or more.

3. The method of claim 2 wherein said container provides a minimum of six inches of drilling fluid surrounding said detector so as to provide for said self-shielding.

4. The method of claim 1 wherein said given time period for measurement of said gamma radiation within said energy band provides a minimum of least 100 gamma ray counts.

5. The method of claim 1 wherein said energy band is centered about 1460 KEV.

6. The method of claim 5 wherein said energy band extends from 1360 KEV. to 1560 KEV.

7. The method of claim 1 wherein said container is in the form of a flowline through which said drilling fluid is continuously passed and which includes a recessed portion into which said gamma radiation detector is inserted so as to be exposed to gamma radiation from said drilling fluid and at the same time be shielded from external background gamma radiation by said flowing drilling fluid.

* * * * *